(12) United States Patent
Westphal et al.

(10) Patent No.: US 10,824,989 B2
(45) Date of Patent: Nov. 3, 2020

(54) POWER HARVESTING INVENTORY MANAGEMENT SYSTEM WITH IDENTITY VERIFICATION

(71) Applicant: W.W. Grainger, Inc., Lake Forest, IL (US)

(72) Inventors: Geoffry A. Westphal, Evanston, IL (US); Ray "Qianyu" Rui, Lake Forest, IL (US); Eun Sem Kil, Lake Forest, IL (US); Jerry Shim, Lake Forest, IL (US); Svetlana Kharlamova, Lake Forest, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 0 days.

(21) Appl. No.: 16/135,646

(22) Filed: Sep. 19, 2018

(65) Prior Publication Data

US 2019/0087771 A1    Mar. 21, 2019

Related U.S. Application Data

(60) Provisional application No. 62/560,347, filed on Sep. 19, 2017.

(51) Int. Cl.
*G06Q 10/08* (2012.01)
*G08B 13/22* (2006.01)
*H04W 4/80* (2018.01)
*G06Q 50/28* (2012.01)
*H02S 40/38* (2014.01)
*H02K 35/00* (2006.01)
*H02N 1/04* (2006.01)
*H04W 4/35* (2018.01)
*H04W 4/20* (2018.01)

(52) U.S. Cl.
CPC .......... *G06Q 10/087* (2013.01); *G06Q 50/28* (2013.01); *G08B 13/22* (2013.01); *H04W 4/80* (2018.02); *H02K 35/00* (2013.01); *H02N 1/04* (2013.01); *H02S 40/38* (2014.12); *H04W 4/20* (2013.01); *H04W 4/35* (2018.02)

(58) Field of Classification Search
CPC .. G06Q 10/087; G06Q 50/28; G06Q 10/0833; H04W 4/80; H04W 4/35
USPC ................................ 235/375, 376, 383, 385
See application file for complete search history.

(56) References Cited

U.S. PATENT DOCUMENTS 6,996,538 B2 * 2/2006 Lucas .................... G06Q 10/06
705/28
8,044,804 B1 * 10/2011 McReynolds ........... G01S 13/04
235/375
10,121,122 B2 * 11/2018 Russell ............... G06Q 10/087
(Continued)

*Primary Examiner* — Paultep Savusdiphol
(74) *Attorney, Agent, or Firm* — Greenberg Traurig, LLP

(57) ABSTRACT

An inventory management system includes a beacon or button connected to a warehouse server. The beacon buttons are placed in or near a product storage area with a number of products. The beacon has a controller and a transceiver to communicate with a server. There is a user input on the front of the beacon and several sensors able to detect a user identity and interaction with the products. When the user input is triggered, the beacon sends a message to the warehouse server including a user identity and other sensor data. Additionally, the beacon includes an energy harvester configured to power the beacon from ambient or user provided energy.

9 Claims, 7 Drawing Sheets

(56) References Cited

U.S. PATENT DOCUMENTS

| | | | |
|---|---|---|---|
| 2007/0067203 A1* | 3/2007 | Gil | G06Q 10/087 705/7.32 |
| 2009/0134997 A1* | 5/2009 | Godlewski | G06Q 10/087 340/539.1 |
| 2009/0231138 A1* | 9/2009 | Lai | G06K 19/0707 340/572.4 |
| 2011/0147468 A1* | 6/2011 | Park | G06K 19/0704 235/492 |
| 2013/0194097 A1* | 8/2013 | Joseph | G08B 13/2417 340/572.1 |
| 2014/0138440 A1* | 5/2014 | D'Ambrosio | G06K 7/1413 235/385 |
| 2015/0186689 A1* | 7/2015 | Hess | G06K 19/07381 340/10.1 |
| 2015/0379317 A1* | 12/2015 | Kelly | G06Q 10/087 705/28 |
| 2015/0379459 A1* | 12/2015 | Russell | G06Q 10/087 235/380 |
| 2018/0150787 A1* | 5/2018 | Russell | G06Q 10/087 |

* cited by examiner

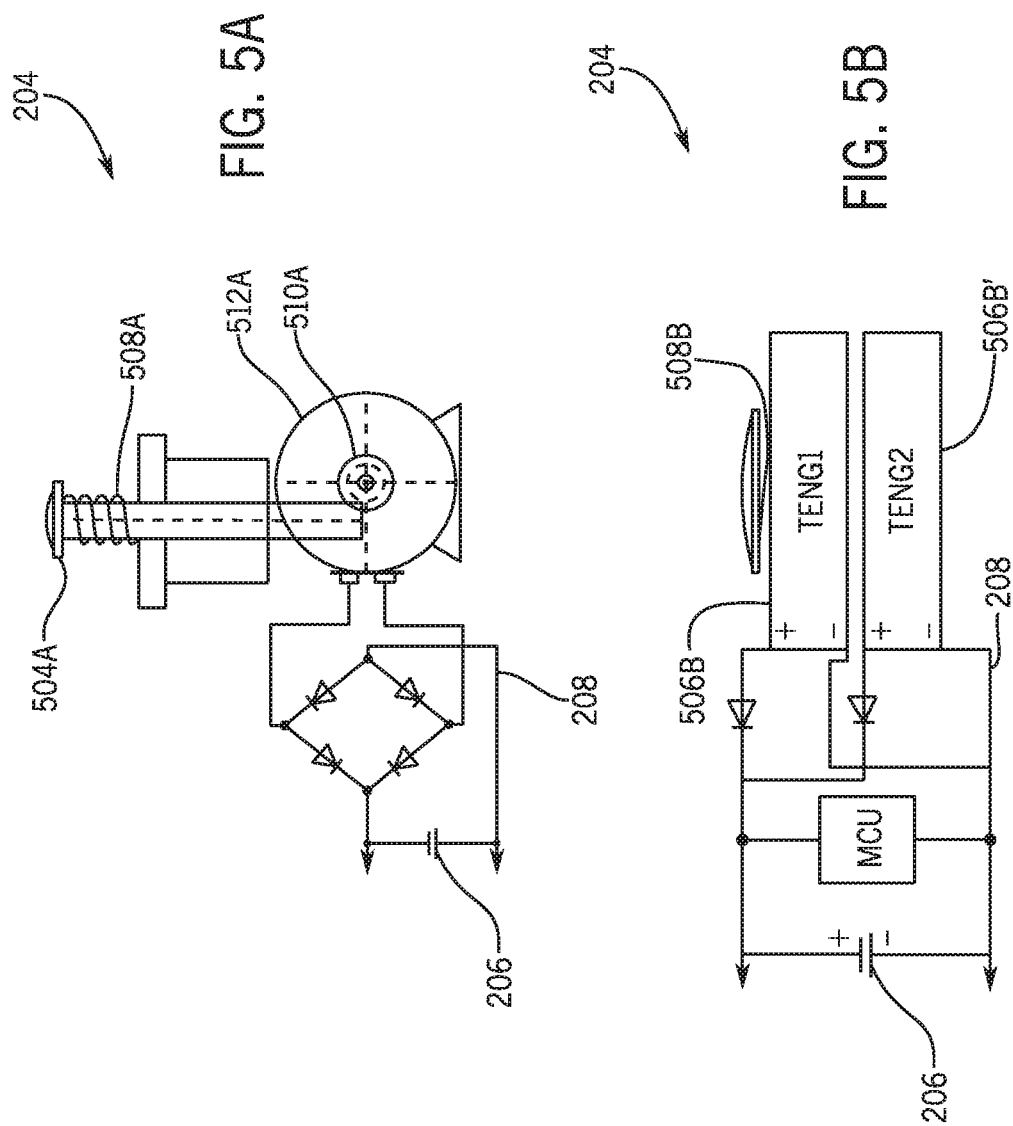

POWER HARVESTING INVENTORY MANAGEMENT SYSTEM WITH IDENTITY VERIFICATION

CROSS REFERENCE TO RELATED APPLICATIONS

This application is a non-provisional applications claiming priority to Provisional Application No. 62/560,347 entitled "Grainger Reorder Button" filed Sep. 19, 2017, assigned to the assignee hereof and hereby expressly incorporated by reference in its entirety.

FIELD OF THE DISCLOSURE

The present disclosure relates generally to an inventory management system and, more particularly, to various methods and apparatus for a long-term installation in a warehouse with ordering and reordering inventory capabilities including user identity verification and tracking.

BACKGROUND OF RELATED ART

In many business settings, where vendors manage customers' inventory, several million bins of products are managed at one time. Typical reorder buttons are battery powered and simple: sending a static signal each and any time the button is pushed. These example signals are either a trigger for constant reorder quantity or a simple signal that items were taken from the storage area.

Having to purchase and replace batteries in buttons used to initiate a restocking order of product in such bins can be costly and impractical and not environmentally responsible. Existing warehouse spaces could be converted but often at great cost of material and capital. Accordingly, there is an identifiable need to place an inventory management system that can, among other things, be installed relatively quickly and efficiently.

Further, commercial warehouses and other storage areas often have a number of users and even organizations in charge of managing shelf space. Therefore, there is a need for identification of the person taking products from a stocking location to, for example, verify their authorization to do so. A system is needed to identify and track who is using and reordering products to understand the supply chain more fully.

BRIEF DESCRIPTION OF THE DRAWINGS

FIG. 5A is a representation of one example energy harvesting system of the present disclosure.

FIG. 5B is a representation of another example energy harvesting system of the present disclosure.

DETAILED DESCRIPTION

The following description of example methods and apparatus is not intended to limit the scope of the description to the precise form or forms detailed herein. Instead the following description is intended to be illustrative so that others may follow its teachings.

The following disclosure relates broadly to a long-term embedded system for installation in a warehouse with ordering and reordering inventory management capabilities including user identity verification and tracking. In order to satisfy these long-term power needs, the inventory management system needs to generate power without external connection to a standard electrical grid or a short lived chemical battery during at least some parts of its expected lifespan. The harvesting energy battery-less sources discussed in more detail below include, but are not limited to: solar, ambient radiation, electromechanical, piezoelectric, or modified triboelectric nanogenerator. The harvested power is used to power an embedded microcontroller.

The majority of microcontrollers in use today are embedded in other machinery, such as automobiles, telephones, appliances, and peripherals for computer systems. While some embedded systems are very sophisticated, many have minimal requirements for memory and program length, with no operating system, and low software complexity. Typical input and output devices include switches, relays, solenoids, LED's, small or custom liquid-crystal displays, radio frequency devices, and sensors for data such as temperature, humidity, light level etc. Embedded systems usually have no keyboard, screen, disks, printers, or other recognizable I/O devices of a personal computer, and may lack human interaction devices of any kind. In the examples described below, a low power microcontroller is used to control the point of interaction of the user with the example inventory management system.

The disclosed systems for implementing the inventory management improve upon reorder buttons that are typically powered with disposable batteries. In a typical button, the only function the button performs is to cause a reorder of a single item in a set unchangeable quantity. Pressing the prior button transmits an unchanging message to a server, which triggers a reorder shipment to be sent to the customer's address assigned to the button. It does not matter who pressed the button at the customer's address—the reorder is initiated for the same quantity and without checking to see if the button was pushed by an authorized person.

Figure 1:
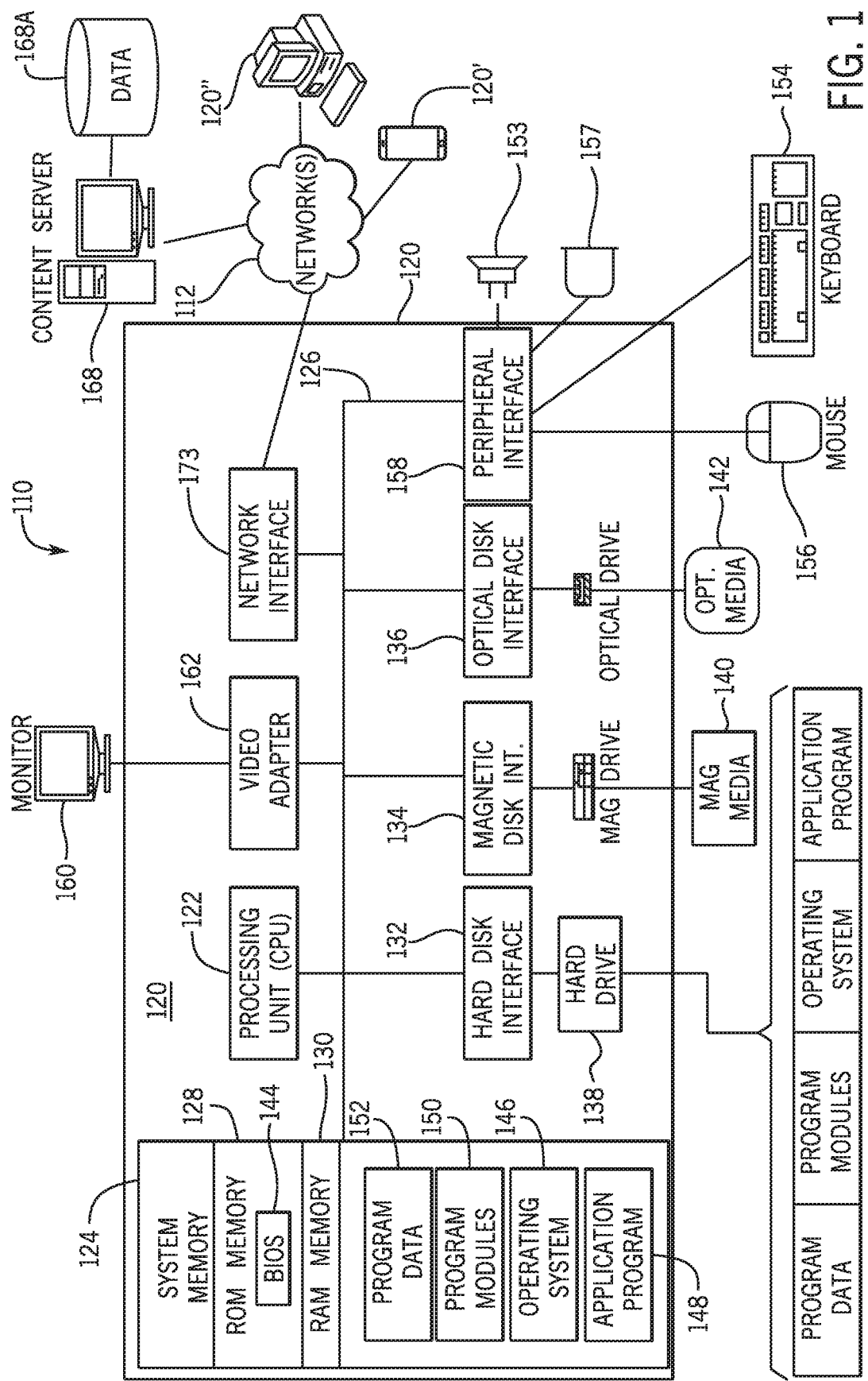
FIG. 1 is a block diagram illustrating components of an example network system in which the systems and methods described hereinafter may be employed.

With reference to the figures, and more particularly, with reference to FIG. 1, the following discloses an example system 110 as well as other example systems and methods for inventory management on a networked and/or standalone computerized device, such as a personal computer, tablet, or mobile device. To this end, a processing device 120" illustrated in the example form of a mobile communication device, a processing device 120', illustrated in the example form of a computer system, and a processing device 120 illustrated in schematic form, are provided with executable instructions to, for example, provide a means for a user, e.g., a warehouse employee, a vendor restocking crew, etc., to access a host system server 168 and, among other things, be connected to a hosted location, e.g., a website, mobile application, central application, data repository, etc.

Generally, the computer executable instructions reside in program modules which may include routines, programs, objects, components, data structures, etc. that perform particular tasks or implement particular abstract data types. Accordingly, those of ordinary skill in the art will appreciate that the processing devices 120, 120', 120" illustrated in FIG. 1 may be embodied in any device having the ability to execute instructions such as, by way of example, a personal computer, a mainframe computer, a personal-digital assistant ("PDA"), a cellular telephone, a mobile device, a tablet, an e-reader, or the like. Furthermore, while described and illustrated in the context of a single processing device 120, 120', 120", those of ordinary skill in the art will also appreciate that the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the example processing device 120 includes a processing unit 122 and a system memory 124 which may be linked via a bus 126. Without limitation, the bus 126 may be a memory bus, a peripheral bus, and/or a local bus using any of a variety of bus architectures. As needed for any particular purpose, the system memory 124 may include read only memory (ROM) 128 and/or random access memory (RAM) 130. Additional memory devices may also be made accessible to the processing device 120 by means of, for example, a hard disk drive interface 132, a magnetic disk drive interface 134, and/or an optical disk drive interface 136. As will be understood, these devices, which would be linked to the system bus 126, respectively allow for reading from and writing to a hard disk 138, reading from or writing to a removable magnetic disk 140, and for reading from or writing to a removable optical disk 142, such as a CD/DVD ROM or other optical media. The drive interfaces and their associated computer-readable media allow for the nonvolatile storage of computer-readable instructions, data structures, program modules, and other data for the processing device 120. Those of ordinary skill in the art will further appreciate that other types of non-transitory computer-readable media that can store data and/or instructions may be used for this same purpose. Examples of such media devices include, but are not limited to, magnetic cassettes, flash memory cards, digital video-disks, Bernoulli cartridges, random access memories, nano-drives, memory sticks, cloud based storage devices, and other read/write and/or read-only memories.

A number of program modules may be stored in one or more of the memory/media devices. For example, a basic input/output system (BIOS) 144, containing the basic routines that help to transfer information between elements within the processing device 120, such as during start-up, may be stored in ROM 128. Similarly, the RAM 130, hard drive 138, and/or peripheral memory devices may be used to store computer executable instructions comprising an operating system 146, one or more applications programs 148 (such as a Web browser, mobile application, etc.), other program modules 150, and/or program data 152. Still further, computer-executable instructions may be downloaded to one or more of the computing devices as needed, for example via a network connection.

To allow a user to enter commands and information into the processing device 120, input devices such as a keyboard 154 and/or a pointing device 156 are provided. In addition, to allow a user to enter and/or record sounds into the processing device 120, the input device may be a microphone 157 or other suitable device. Still further, while not illustrated, other input devices may include a joystick, a game pad, a scanner, a camera, touchpad, touch screen, motion sensor, etc. These and other input devices would typically be connected to the processing unit 122 by means of an interface 158 which, in turn, would be coupled to the bus 126. Input devices may be connected to the processor 122 using interfaces such as, for example, a parallel port, game port, firewire, a universal serial bus (USB), etc. To view information from the processing device 120, a monitor 160 or other type of display device may also be connected to the bus 126 via an interface, such as a video adapter 162. In addition to the monitor 160, the processing device 120 may also include other peripheral output devices, such as, for example, speakers 153, cameras, printers, or other suitable device.

As noted, the processing device 120 may also utilize logical connections to one or more remote processing devices, such as the host system server 168 having associated data repository 168A. The example data repository 168A may include any suitable inventory data including, for example, product types, supplier information, reorder tracking, user identities and authorizations, etc. In this example, the data repository 168A includes a repository of at least one of specific or general inventory data related to a product. For instance, the repository may include a number and supplier relating to their product in the specific bin to which it is attached and an aggregation of such data as desired.

In this regard, while the host system server 168 has been illustrated in the example form of a computer, it will be appreciated that the host system server 168 may, like processing device 20, be any type of device having processing capabilities. Again, it will be appreciated that the host system server 68 need not be implemented as a single device but may be implemented in a manner such that the tasks performed by the host system server 168 are distributed amongst a plurality of processing devices/databases located at different geographical locations and linked through a communication network. Additionally, the host system server 168 may have logical connections to other third party systems via a network 112, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, customer servers, vendor servers, additional data repositories, etc.

For performing tasks as needed, the host system server 168 may include many or all of the elements described above relative to the processing device 120. In addition, the host system server 168 would generally include executable instructions for, among other things, initiating a reordering process, tracking inventory, evaluating and authenticating a user identity, etc.

Communications between the processing device 120 and the host system server 168 may be exchanged via a further processing device, such as a network router (not shown), that is responsible for network routing. Communications with the network router may be performed via a network interface component 173. Thus, within such a networked environment, e.g., the Internet, World Wide Web, LAN, cloud, or other like type of wired or wireless network, it will be appreciated that program modules depicted relative to the processing device 120, or portions thereof, may be stored in the non-transitory memory storage device(s) of the host system server 68.

Figure 2:
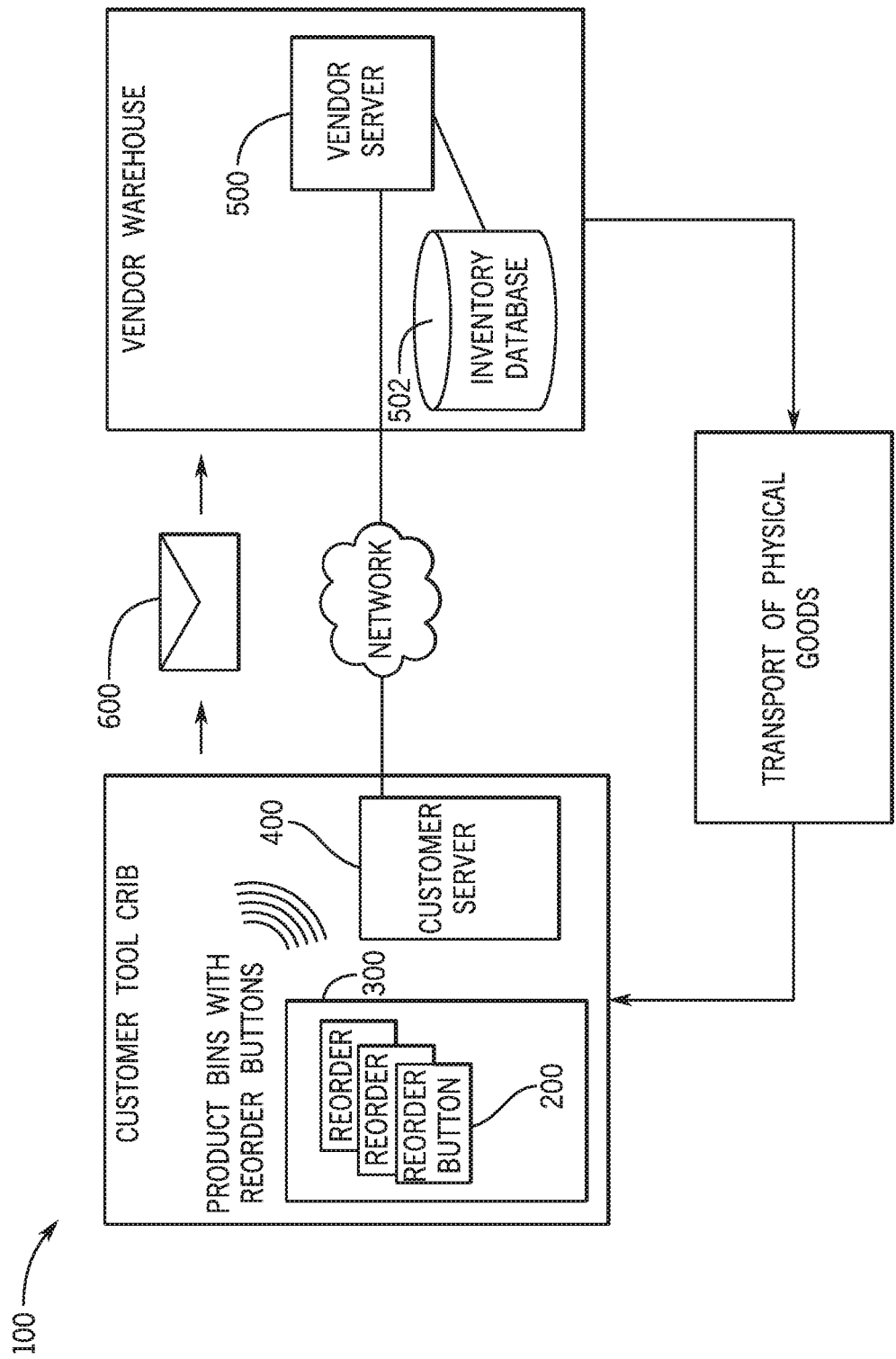
FIG. 2 is block diagram describing an example inventory management system according to the present disclosure.

The inventory management system 200 shown in FIG. 2 of the present disclosure shown uses a reordering button powered without assistance of a battery. The example inventory management system 200 is disclosed in one example use for the context of the rest of the disclosure. An example reorder button 200 is affixed to a product storage area such as a keep stock bin 300. When the example reorder button 200 is triggered to indicate that the level of inventory has been lowered, the button 200 connects to a customer server 400 and sends a message 600 to the vendor server 500 containing information about the product and user who ordered it. The vendor server 500 processes the message 600 using a standard protocol and updates the inventory levels of bin 300 in the database 502. If the vendor server 500 calculates that the bin is low on product, it orders more of the product to be delivered and stocked in the bin by a courier 700.

Figure 3:
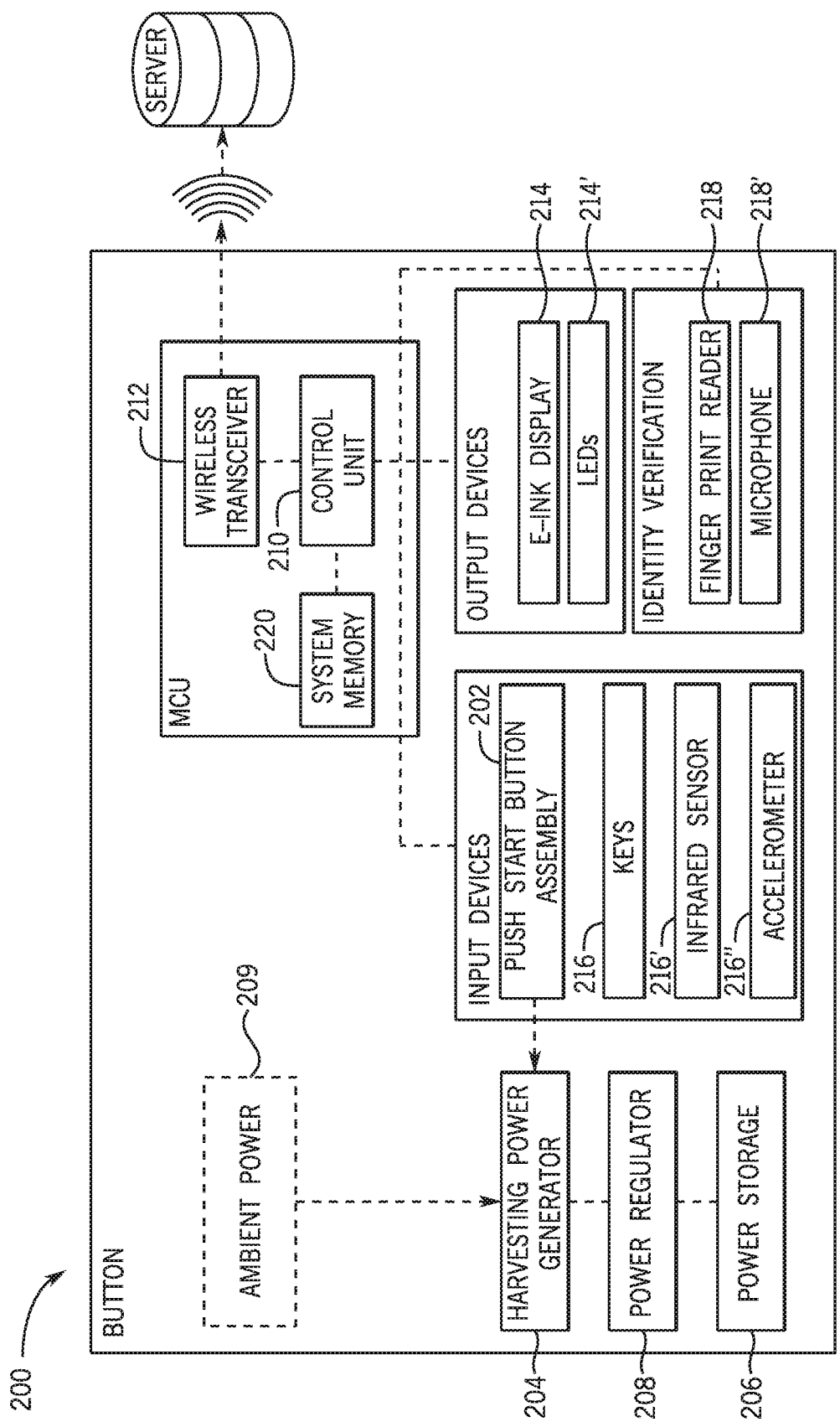
FIG. 3 is an isometric view of an example beacon for an inventory management system according to the present disclosure.
Figure 4:
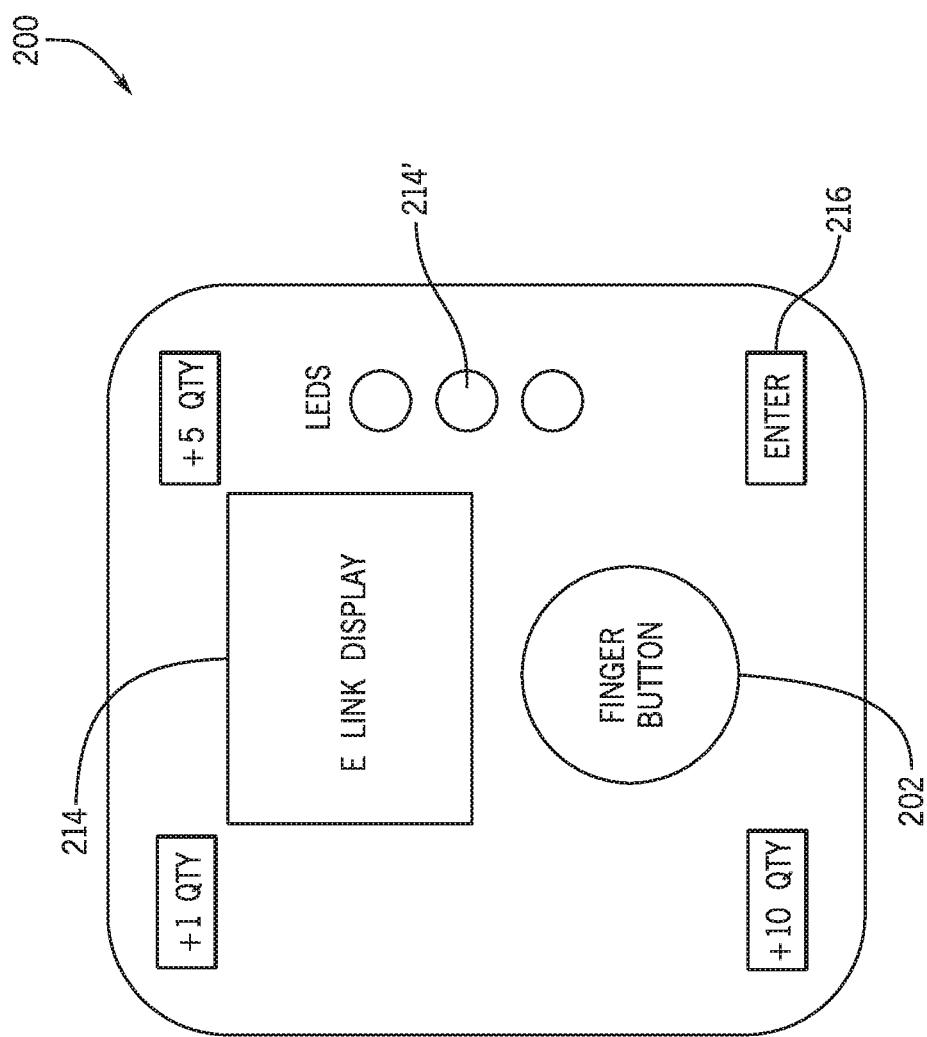
FIG. 4 is a block diagram of the example beacon of FIG. 3.

Referring now to FIG. 3, the features and components of an example reorder button 200 according to the teachings of the present disclosure. The button 200 consists of a housing containing a push start button assembly 202, a harvesting power generator 204 connected to a power storage 206 through a power regulator 208, all controlled by a microelectronic control unit (MCU) 210. The MCU 210 is also connected to a number of other input, output, and identity verification devices discussed in more detail below. The external features of an example button 200 are shown in FIG. 4.

Overall, the example reorder button 200 uses the push-start button assembly 202 as well as using one or more of the harvesting energy sources 204 to generate electricity from some form of ambient energy and store the generated power in a power storage device 206 connected to a microelectronic control unit (MCU) 210. When the MCU 210 of the example button 200 connects to Wi-Fi using a transceiver 212, it connects to a server 500, activates an output device such as a display 214, and allows the user to input the number of items taken from the corresponding bin using an input device such as keys 216 or other sensors like infrared sensor 216', and accelerometers 216". The MCU 210 gathers inputs from the sensors. Once the inputs are gathered, an example message 600 is assembled with the input data. In the example button 200, a message is transmitted by the transceiver 212 to a server 500. The system includes a built-in biometric recognition using sensors like fingerprint reader 218 and microphone 218' used for user identification and transmitted as part of the message 600.

The button 200 serves as the user's point of interaction with the inventory management system 100 containing both input devices and output devices to interact more granularly with the button 200. This allows the button 200 to work in various ways, as in the example described above, the button 200 can be used to In other examples, the button 200 is used to log whenever a product is taken from or placed into the bin 300. In yet further examples, the button 200 is directly used to reorder a number of products set by the user through the input devices. Other input devices can be used to verify the identity of the user taking the products out of the bin 300 or otherwise interacting with the button 200.

Because the buttons 200 are placed in many locations that are not easily accessible and may be hard to route electricity to the device, the buttons use a primary push-start button assembly 202. In the example shown in FIG. 3, the push start button assembly 202 is used both as an input device and as a source of energy. The kinetic energy is converted to electrical energy using a harvesting power generator 204.

The harvesting power generation 204 allows the button 200 to be used in locations where traditional means of electrical power such as connecting to the building's wall outlets and main power is unavailable and where replacing chemical batteries is undesirable and inefficient. The harvesting power generator in the example shown in FIG. 3 allows each press of the button 200 to charge the power storage 206. Numerous mechanisms can be used to draw various forms of energy into the button 200 including but not limited to a user's input kinetic energy, solar radiation, and ambient radio energy as, for example, in radio crystal set. Other methods can include electromechanical which is the movement of a magnet in an electromagnetic generator or piezoelectric materials to generate an electric current when induced by a mechanical strain. Another example could use contact electrification as in triboelectric nanogenerator (TENG). Each of these sources, alone or in combination of several of the above mentioned methods by the button 200 can be used to provide power.

One example harvesting electromagnetic power generation 204 is shown in FIG. 5A which is a representation of one example energy harvesting system of the present disclosure showing the harvesting power generator 204, the power storage 206 and a power regulator 208 connected between the two. The electromagnetic system uses a moving magnetic field caused by the range of action of the button press to generate an electric current. A harvesting power generation 204 like that shown in FIG. 5A is used in FIG. 3. When this electromagnetic harvesting power generation 204 is used, alone or in combination with multiple harvesting energy sources as shown in block diagram of FIG. 1, the user initiates the power generation by pressing a push start button assembly 202. In this example, an electromechanical power generating component is used to generate the electrical current. A few presses of the button may be needed to generate enough power because each press may not generate a large amount of power. When enough power is stored in the super-capacitor and power storage 206, the display 214 or an LED can be lit to alert the customer the Reorder Button is ready for input to indicate the quantity of product taken or otherwise use the button to interact with the inventory management system. A TENG based power generation is used in the same way, often requiring multiple presses to fully charge the device. The level at which the display 214 would engage in some examples is calibrated to have enough surplus energy to complete a wireless connection and message delivery to the inventory management system 100.

Referring to FIG. 5A, the method of power generation with electromagnetic generator is depicted. When the example push start button 202 is pressed, the translational motion of the user's finger turns into a movement of the rod 504A. The push button is spring-loaded with a resilient member 508A so that the potential energy is stored and the push start button assembly 202 is returned back. The rod assembly 504A is connected to the generator rotor 510A, which rotates in a magnetic field created by semi-rings 512A. Electromagnetic induction is created transmitting an electric current to the power storage 206. Under the action of the spring 508A, the rod 504A goes up, and the output voltage changes sign. To provide positive output voltage, a rectifier 502 is placed on the diodes. The generator generates current and voltage when the button is pressed and released in either direction.

Another example harvesting triboelectric power generation 204 is shown in FIG. 5B which is a representation of another example energy harvesting system of present disclosure. The example triboelectric power generator 204 works by contract electrification generating an electrical current by the interaction of two touching materials.

Referring back to FIG. 5B, a power generation with triboelectric nanogeneration (TENG). TENG is based on a combination of contact electrification and electrostatic induction. The TENG harvesting power generator 204 generates an alternative current (AC) pulse output during a periodic switching. When the push start button assembly 202 is pressed the translational motion of the user's finger turns into a movement of the TENG harvesting power generator 204. The two triboelectric layers of each of the triboelectric generators 506B, 506B' contact and the charge will transfer between the two materials. In this condition, one material surface that possesses a strong electron-attracting ability will produce negative charges. Positive charges will appear on the outer surface of the triboelectric generators 506B, 506B'. When the external force is released (may be accelerated by spring 508B), an electric potential difference is established because of a separation of the two materials. To create a double alternative AC effect, the example uses a pair of TENGs, so at least one can generate current in both directions using both states, when the button is both pressed and released. The advantage of using TENG is the simple structure and a higher power output, which can extract electrical energy from mechanical energy. To provide positive output voltage, a rectifier is placed on the diodes. The operational amplifier and a parametric voltage stabilizer 502 may be used, accordingly, to increase the amplitude of an electrical signal and stabilize or adjustable output voltage.

In addition to the above methods, the button can be charged by wireless charger (not shown) if needed. Wireless charging works by transferring energy from the charger to a receiver built into the button via electromagnetic induction. The induction charger uses an induction coil to create an alternating electromagnetic field, which the receiver coil in the button converts back into electricity to be fed into the supercapacitor. In the example shown, the internal components of button 200 are arranged in the interior space of the button. Inside the button 200, a transmitting member is configured to wirelessly transfer power to a receiving member that is conventionally coupled to the chargeable reorder button for charging the supercapacitor.

Before the generated power is stored, the power is sent through a power regulator 208. To ensure the safety and proper use of the other electrical components, the power needs to be rectified and stabilized into a usable voltage using power regulator 208, in this example case, a voltage stabilizer 502. FIGS. 5A-B both show a voltage stabilizer 502, 502' between the example harvesting power generator 204 and power storage 206. The voltage stabilizers 502, 502' are shown respectively in more detail in FIGS. 6A-B.

Figure 6A:
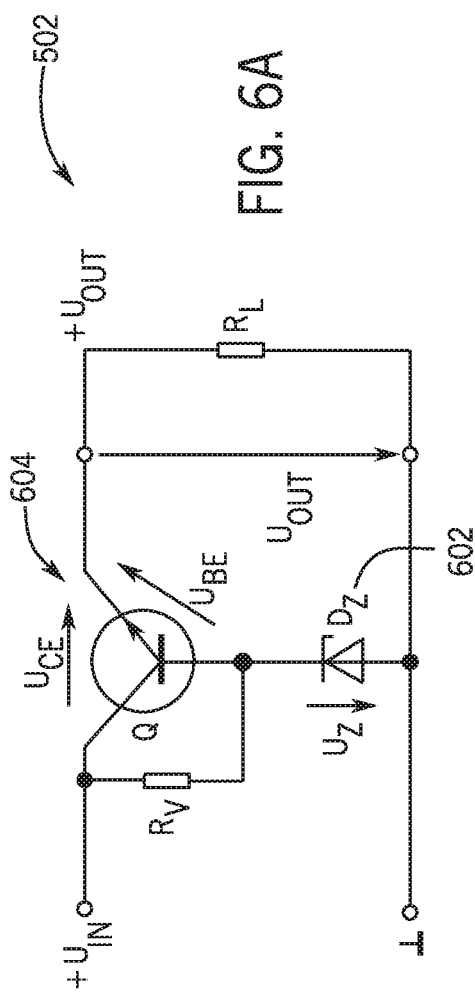
FIG. 6A is a circuit diagram of a parametric voltage stabilizer for use in one example energy harvesting system of the present disclosure.

The voltage stabilizer 502' shown in detail in the circuit diagram of FIG. 6A is a parametric voltage stabilizer which uses a common collector amplifier 604 also known as emitter follower with the base of a regulating transistor connected directly to the voltage reference. In this example shown in FIG. 6A, a parametric voltage stabilizer 502 uses a Zener diode 602 to provide for voltage without adjustment. In general, the voltage stabilizer 502 provides electrical impedance transformation from one circuit to another, with the aim of preventing the signal source from being affected by whatever currents (or voltages, for a current buffer) that the load may produce. In this example, the variable currents and voltages created by the harvesting power generation 204 are isolated from the other electrical components like the power storage 206.

Figure 6B:
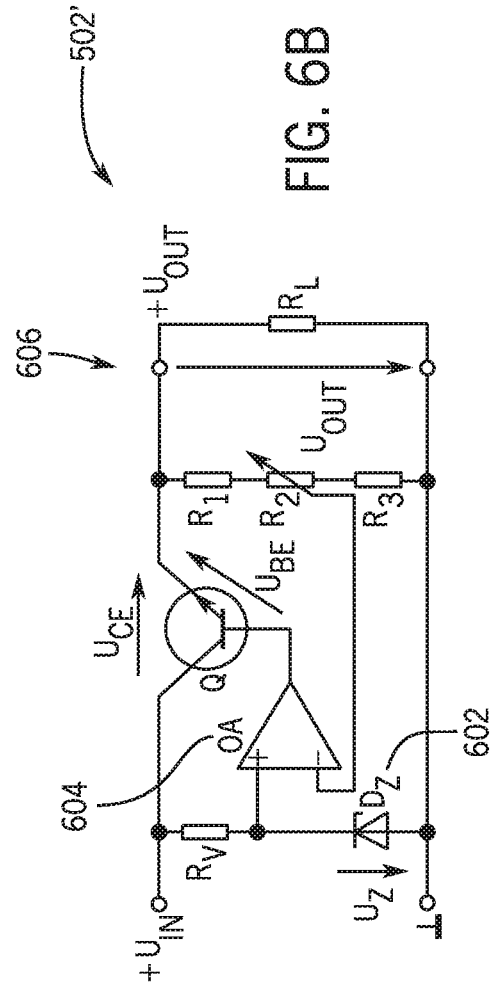
FIG. 6B is a circuit diagram of a power supply regularity voltage stabilizer for use in one example energy harvesting system of the present disclosure.

In other examples, further power regulation is needed. FIG. 6B is a circuit diagram of an example power supply regularity voltage stabilizer 502' with an energy harvesting system of the present disclosure. The stability of the output voltage can be significantly increased by using an operational amplifier 604. FIG. 6B is a power supply with adjustable output voltage. The amplifier 604 has a large gain factor. The stabilizer 502' and the divider 606 share the same voltage. Operational amplifier 602 increases a current and a voltage. If there is a positive current flow and a positive input, then the amplifier 604 increases the current. If there is a negative input, the amplifier 604 inverts it to a positive. When the output currents are low, the current goes through the Rv from the stabilizer 502' and since the current in the Zener diode 602 is stable and the stabilizer functions with a high efficiency, the stability of the output voltage is significantly increased by using operational amplifier.

Referring back to FIG. 3, the power storage 206 in the example shown is a supercapacitor. In other examples of the present device, the power storage 206 may be a rechargeable battery, using chemicals like lithium ion or other suitable materials. The choice of power storage 206 device is driven by the efficiency of storing and accessing the power contained therein. Given the low levels of power gained by some ambient and user derived sources, high efficiency access is needed in power storage 206 to provide effectively perpetual use. In some other examples, a large and long lasting initial power supply in the power storage 206 can be supplemented by the energy harvester to power the device over its expected life.

In the example shown in FIGS. 3-4, the supercapacitor or ionistor that is the power storage 206 does not require constant recharge or any other regular care. As a capacitor-ionistor, the power storage 206 has a large capacitance with a small supply of voltage. In the example power storage 206, the capacitance in 1 Farad (F) with the voltage is 1 Volt (V), which is more than sufficient for the discussed uses of the button 200. For comparison, the Earth's ionosphere with respect to the ground is about 1 F. At present time, supercapacitors or ionistors are typically used as a backup power source. One example power storage 206 can be a 5-volt ionistor, which gets full charge in just 10-100 seconds and it can provide the equivalent power of an average LED flashlight for 20-30 minutes.

Inside the button 200, there is the microelectronic control unit (MCU) 210. The MCU is a computerized control system for the button specifically. The MCU is electrically and digitally connected to the system memory 220 in order to store instructions and use data. The system memory 220 in this example saves information regarding product quantity and user verification. The MCU is also connected to the transceiver 212 in order to communicate with customer server or other parts of the inventor management system 100. The transceiver 212 can work over any suitable wireless medium and uses Wi-Fi in the example shown but could also include low energy Bluetooth or RFID alone or together. The transceiver 212 could also function to communicate with a user device as part of the identity verification sequence.

The MCU 210 is the microcontroller or microcontroller unit of the button 200 and is a small computer on a single integrated circuit, being one of the computer devices discussed in detail with regard to FIG. 1. In some examples of the button 200, the MCU 210 is a system on a chip or SoC. As discussed with regard to FIG. 1, the MCU 210 may include one or more CPUs (processor cores) 122 along with memory 130 and programmable input/output peripherals 158. Program memory 152 in the form of Ferroelectric RAM, NOR flash or OTP ROM can also often include the system on a chip, as well as a small amount of RAM 130. In the block diagram shown in FIG. 3, the information is stored in the system memory 220. Microcontrollers like the MCU 210 are designed for embedded applications such as the example button 200 because the microcontroller is a self-contained system with a processor, memory and peripherals.

The MCU is also connected to a number of other input, output, and identity verification devices. Once the MCU is activated and fully powered, the MCU initiates commands to power up the sensors and display and prepares to accept information via its input peripherals. As shown in FIGS. 3-4, the button 200 has a display 214, which is e-ink based in the example shown. The display 214 in the example of FIG. 4 and light emitting diode (LEDs) 214" in other examples serve to deliver information and confirmations to the user of the operation of the button 200. The button 200 also has keys 216 to allow the user to enter information into the inventor management system 100. In the example shown in FIG. 4, the keys are specifically used to increment or decrement the number of product taken from the bin.

In some other examples, the buttons may not be used to count out a number of products, but to signal other information about the user and the products, like quality or urgency. For example, a button is a food storage location may be used by a grocer to indicate that the foodstuffs have spoiled. In another example of the device installed in the retailer's storeroom, there could be an additional button to signal when emergency supplies are needed, such as which products are needed in a hurricane.

In some examples of the button 200, the button may be associated with a single product located in more than one bin or product storage area, for example a kit made up of multiple parts. In such an example situation, each bin in the tool crib would get a reorder button. However, some bins in the demonstrative example would constitute a kit. For the purposes of this example, the bins are numbered 1 to 5. Products may be taken individually from bins 1 to 5 by pressing, say, the green key on any of the buttons 200 associated with each of those bins. For the purposes of this example a kit is desired and the kit includes 1 item from bin 1, 3 items from bin 2, 1 item from bin 3, 4 items from bin 4, and 1 item from bin 5. In this kit example, a kit key would be labeled and colored distinctly, for example, red, would also be placed on at least one of the bins, in addition to the normal single product green key. The example red kit button would be configured to place an indicator that a kit was withdrawn in the message 600 transmitted to the customer's server 300 before it is sent through the internet. When the message is processed by the server, the on-hand quantities for each bin would all be updated when the KIT flag is detected when the red key is pressed.

To assist in automating the inventory management system 100, the button 200 can also include a number of sensors or other sensors like infrared sensor 216', and accelerometers 216" which can detect that products were removed from the product storage area. Using a fingerprint reader 218 affixed to the aforementioned energy harvesting system, not only is the need for a battery eliminated, but the identity of the person taking products from a bin can also be determined. There are various ways of detecting the number of items being removed from the bin after the reorder button has been activated. Keys 216 or a microphone 218' can be used to tell the button how many products were taken from the product storage area.

Figure 7:
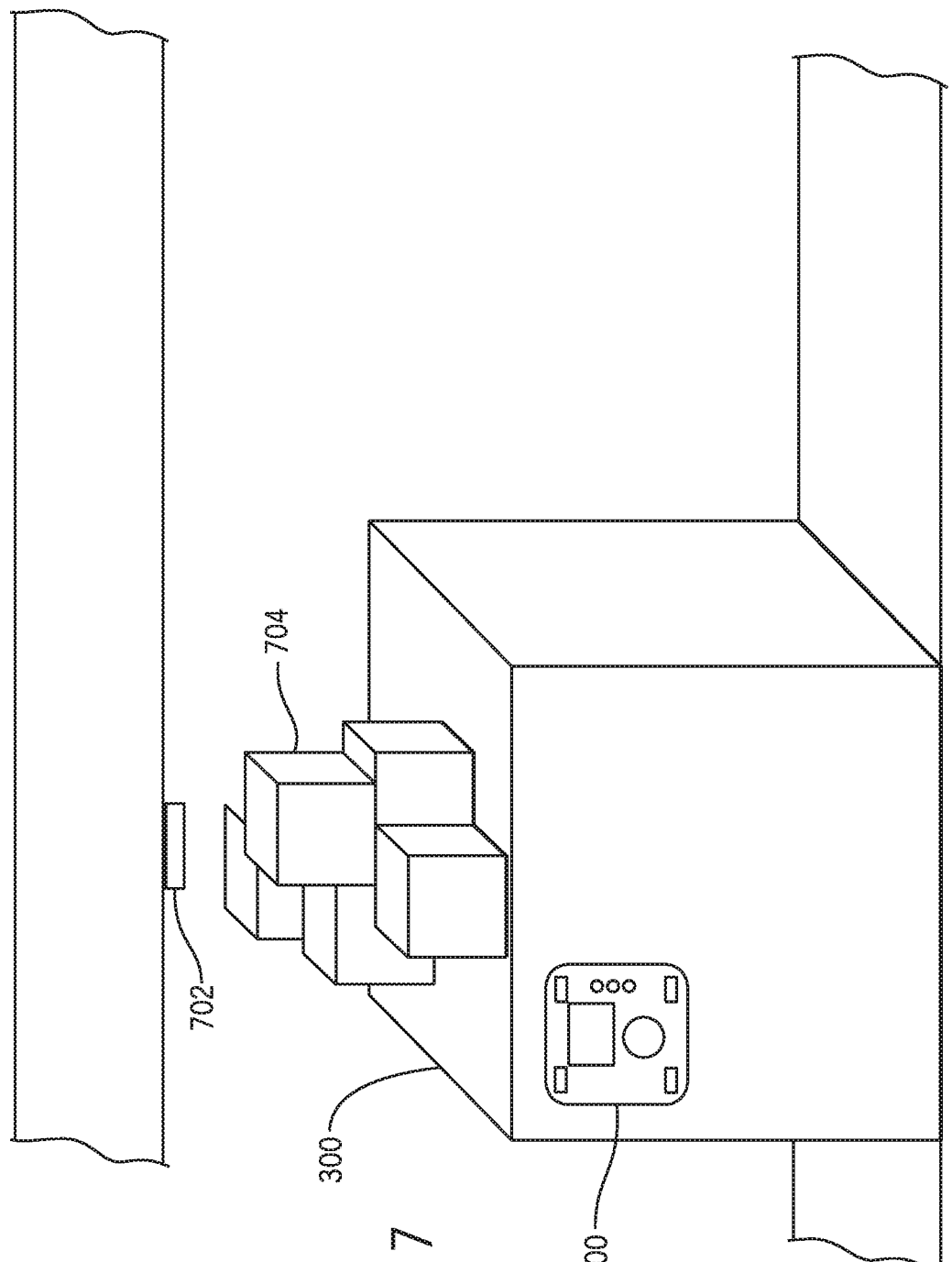
FIG. 7 is a depiction of the example beacon shown in FIG. 2 in use.

In another example of the button 200, an accelerometer, switch, vibration, or other motion sensing type device can be placed in each corner of the case of button 200, as in the example shown where a square button is used. The motion of each corner can be used to increment the number of items taken from the bin in place of keys 216. For example, one corner tap can increment by 1, another corner increment can be 5, one corner increment can be 10. The last corner tap can indicate ENTER, that the QTY inputting is done. Various sensors can be placed on or connected to the button to detect features about the user, the product storage area, and the user interaction. For example, monitoring sensors 702 like RFID readers and motion sensors connected to the button 200 can detect the addition or withdrawal of products from the product storage area. FIG. 7 is a depiction of the example beacon as shown in FIG. 2 in use with the button 200 and monitoring sensors 702 placed around a product storage area 300. The monitoring sensors 702 are used to detect a user interaction with the products 704 stored the designated product storage area.

Sensors on the button 200 can also be used for identity recognition. The button 200 can utilize the user's identity in at least two ways. In the shown example, the user's identity is verified against a list of approved users so that the reorder is not initiated unless the user is authorized to do so. For example, in a vendor managed warehouse situation, the products are reordered by the vendor's own employees and not just anyone walking around the warehouse should be able to trigger a delivery of the product. Using the sensors and other inputs, the users can enter an authorization which can be sent with the order or verified in the MCU 210 itself.

In a second example of the inventory management system, the user's identity is tracked by button and associated with the interaction with the products. The tracking of user interactions allows the customer to understand which employees or vendors are utilizing the product stored in the area associated with each button. For example, a button associated with clean scrubs at a healthcare organization might be able to track which employees are taking abnormally large numbers of clean clothes and abusing their benefits.

Referring back to FIG. 3, the user's identity is detected using one or more of the input devices of the button 200. The MCU 210 process inputs from biometric recognition or identity verification sensors such as a microphone or a fingerprint reader. Biometric verification is any means by which a person can be uniquely identified by evaluating one or more distinguishing biological traits. Unique biometric identifiers can include fingerprints, retina and iris patterns, voice, or even unique vibration patterns of walking. As mentioned above, in some examples, the microphone can be used for voice input of quantity taken from bin, during this reading the sensor can take a voice print. The voice print can be used for identity recognition by analyzing sound wave features that are unique to the specific user.

Similarly, in the shown example of FIG. 3, the fingerprint sensor 218 can be the front of the push start button assembly 202 the customer presses in the case when an electromechanical power generating component is used. The activation of the push start button assembly 202 connects to MCU which sends packets of detected prints data, hash and search to a server via transmitting technology (like wi-fi). Finger prints can be also stored in the onboard FLASH memory. The fingerprint identification process can take place on either the local MCU or on the vendor's server 400.

After the relevant data is gathered, the sensor data is packaged into a message 600. For example, when the inputting of data and the user interaction is completed and the ENTER corner of the Button is tapped, the message 600 package can be created and sent to a customer server 300 via the transceiver 212 in order to process the QTY and the raw fingerprint scanned data. The unique ID of the Button is also included in the message 600. If there is voice input, then digitized audio can be sent as well. An example message 600 is shown in Table 1 below.

TABLE 1

Example Message Packet

| Length | Content |
|---|---|
| 2 Bytes | Frame Control |
| 2 Bytes | Destination |
| 6 Bytes | MAC Address (Destination) |
| 6 Bytes | MAC Address (Source) |
| 6 Bytes | MAC Address (Router) |
| 2 Bytes | Sequence Control |
| 6 Bytes | MAC Address (AP) |
| 0 to 2312 bytes | Data Payload: Unique Bin ID, Quantity Taken, Biometric Input |
| 4 bytes | CRC |

After the message 600 package is assembled, it is transmitted to a customer server 300 using a standard industry protocol like Wi-Fi, Bluetooth, or any other suitable wireless transmission mechanism by the transceiver 212. In some examples, the transmission is routed first to a local mobile device in case a server cannot be reached with the limited transmission capabilities of the button 200 and its low power transceiver 212. In another example, the customer would have to have a mobile device on his/her person when they are interacting with the button 200. When the mobile device receives the message 600 package in this example, the mobile device can relay the message 600 to a customer server 300 or vendor server 400 via similar numerous industry standard techniques for example using a cellular network. In yet other examples, the button 200 directly sends the message 600 to vendor server 300 over, for example, a wireless network.

The customer server 300 can process the message 600 directly or send the message to a vendor server 400. When the vendor server 400 received the message package, it decodes the information. The vendor server 400 uses the unique ID of the button 200 to adjust the inventory amount by the customer inputted QTY of the specific product associated with that button 200. The vendor server 400 also processes the identity information, such as the scanned fingerprint sensor data, to determine who took the inventory. As mentioned, this information can help the customer track internal usage patterns for products in each bin or be used to verify that the person is authorized to reorder product.

The server 400 also tracks the amount of inventory in the particular product storage area and after that quantity falls below a given threshold, the product is ordered to refill the warehouse supply. The reorder, in some examples, is a trigger that is sent to a product warehouse placing a purchase replenishing the quantity of the product corresponding to the unique ID of the button 200 associated with the bin 300 shown in FIG. 1. In this example, the products are ordered automatically by the vendor server 400. In other examples messages can be triggered at the vendor server 400 when the level of the bin reaches a certain threshold, to alert the person at the vendor who makes visits to the customer location to check on and restock the items in the bins. In yet further examples, a drone could be sent with product if the product is critically needed or if there is another emergency scenario.

The vender server 400 can also monitor the rate at which products are being consumed and provide reports to interested parties like the customer, salesman, vendor, or other suitable personage. For example, a notification could be sent if a customer takes more than a preset number of product SKUs from the product storage at one time or within a certain period of time. That preset number is set by the user to signify that the velocity of SKUs being taken from the bin has dramatically increased and cause an alarm. In this example, the message could be to the Account Manager, who would be prompted to investigate or a message to the customer asking if product levels need to be increased in view of increased local demand. In the example buttons 200, where there is a fingerprint sensor to keep track of, for example, who and what department SKUs should be billed to, it is possible that someone who is not "in the system" can take out SKUs from the bin. When someone unauthorized removes a product or if product is removed without any identifying information being provided, another example alarm message would be sent to the appropriate person(s) so they can take action.

The example button 200 as part of an integrated inventory management system 100 provides for a long-term solution to easily track and reorder product in an existing warehouse. By using the energy harvesting system and the built-in biometric recognition unit, the inventory management system 100 herein described allows for an efficient and easy to install solution to a customer's needs. The reorder button allows tracking the actual number of items being removed from the bin after the button has been activated and who has taken them. In this way, the inventory management system 100 provides much needed and detailed product consumption information to help customers understand their product consumption patterns.

Although the inventory management system 100 and button 200 of the present disclosure have been described with respect to keeping stock of product in warehouse bins, the present disclosure is not so limited. Instead, the inventory management system 100 of this disclosure may be used to monitor all sorts of products, for example on store shelves, or in a dwelling's linen closet. Furthermore, inventory management systems 100 and buttons 200 consistent with this disclosure may have different dimensions and arrangements than those explicitly shown and described herein, with such dimensions and arrangements selected as appropriate for a desired tracking inventory management system 100 or button 200 or object to which the button 200 is to be secured.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:
1. An inventory management system comprising:
a beacon device; and
a server;

wherein the beacon device is adapted to be affixed to a product storage area and the beacon device comprises:
a controller;
a memory device, coupled to the controller, storing data that functions to at least uniquely identify the beacon device;
a transmitter, coupled to the controller, adapted to transmit a communication for reception by the server, the communication comprising the data stored in the memory device;
an energy storage device, coupled to the controller and the transmitter;
an output device, coupled to the controller and the energy storage device;
a user input button, coupled to the controller; and
an energy harvester device, coupled to the user input button and the energy storage device, the energy harvester device configured to generate an amount of electrical energy in response to a movement of the user input button for storage in the energy storage device;
wherein, when the amount of electrical energy stored in the energy storage device is determined by the controller to be sufficient to allow the transmitter to transmit the communication for reception by the server, the controller is further configured to activate the output device and cause the transmitter to transmit the communication in response to a subsequent movement of the user input button.

2. The inventory management system of claim 1 further comprising at least one sensor configured to detect a user identity, wherein the communication further comprises data indicative of the detected user identity.

3. The inventory management system of claim 1 wherein the energy storage device is a supercapacitor or an ionistor.

4. The inventory management system of claim 1 wherein the transmitter is wirelessly connected to the server.

5. The inventory management system of claim 4 where the transmitter is wirelessly connected to the server via a low power Bluetooth connection.

6. The inventory management system of claim 1, wherein a reception of the communication from the beacon device signals to the server a removal of a predetermined amount of product from the product storage area and the server is configured to automatically initiate an order to replenish the product at the product storage area via a physical goods delivery means when the removal of the predetermined amount of product causes an amount of remaining product in the product storage area to fall below a predetermined threshold.

7. A beacon device for use with an inventory management system having a server, the beacon comprising:
a controller;
a memory device, coupled to the controller, storing data that functions to at least uniquely identify the beacon device;
a transmitter, coupled to the controller, adapted to transmit a communication for reception by the server, the communication comprising the data stored in the memory device;
an energy storage device, coupled to the controller and the transmitter;
an output device, coupled to the controller and the energy storage device;
a user input button, coupled to the controller; and
an energy harvester device, coupled to the user input button and the energy storage device, the energy harvester device configured to generate an amount of electrical energy in response to a movement of the user input button for storage in the energy storage device;
wherein, when the amount of electrical energy stored in the energy storage device is determined by the controller to be sufficient to allow the transmitter to transmit the communication for reception by the server, the controller is further configured to activate the output device and cause the transmitter to transmit the communication in response to a subsequent movement of the user input button.

8. The beacon device of claim 7 further comprising a sensor adapted to detect a user in the product storage area and wherein the communication further comprises data indicative of the detected user.

9. The beacon device of claim 7 further comprising a microphone and wherein the communication further comprises data generated by the microphone.

* * * * *